United States Patent [19]

Garrett

[11] 4,032,111

[45] June 28, 1977

[54] TOGGLE CLAMP FOR STRINGING COMPOUND BOW

[76] Inventor: Thomas Aubrey Garrett, 4520 Piute Place, San Diego, Calif. 92117

[22] Filed: Nov. 5, 1976

[21] Appl. No.: 739,289

[52] U.S. Cl. .................................................. 254/77
[51] Int. Cl.² .......................................... B66F 3/00
[58] Field of Search .............................. 254/77–79, 254/123

[56] References Cited

UNITED STATES PATENTS

| | | | |
|---|---|---|---|
| 1,519,982 | 12/1924 | Pasdera | 254/77 |
| 2,557,499 | 6/1951 | Davis | 254/77 |
| 2,937,001 | 5/1960 | Johnson | 254/78 |
| 3,180,620 | 4/1965 | Ramsey | 254/123 |

*Primary Examiner*—Gary L. Smith
*Assistant Examiner*—Robert C. Watson
*Attorney, Agent, or Firm*—Brown & Martin

[57] ABSTRACT

A bow stringing device particularly for stringing of compound bows includes a central elongated body member having a cable and hook extending from one end thereof for hooking one end of one of the bow cables and a movable hook and cable member extending through a guide member on the opposite end of the body member for hooking the other cable, and having the movable cable connected to a pivotal lever connected to the central body member, with the lever pivotal to a tensioned position and a released position.

8 Claims, 2 Drawing Figures

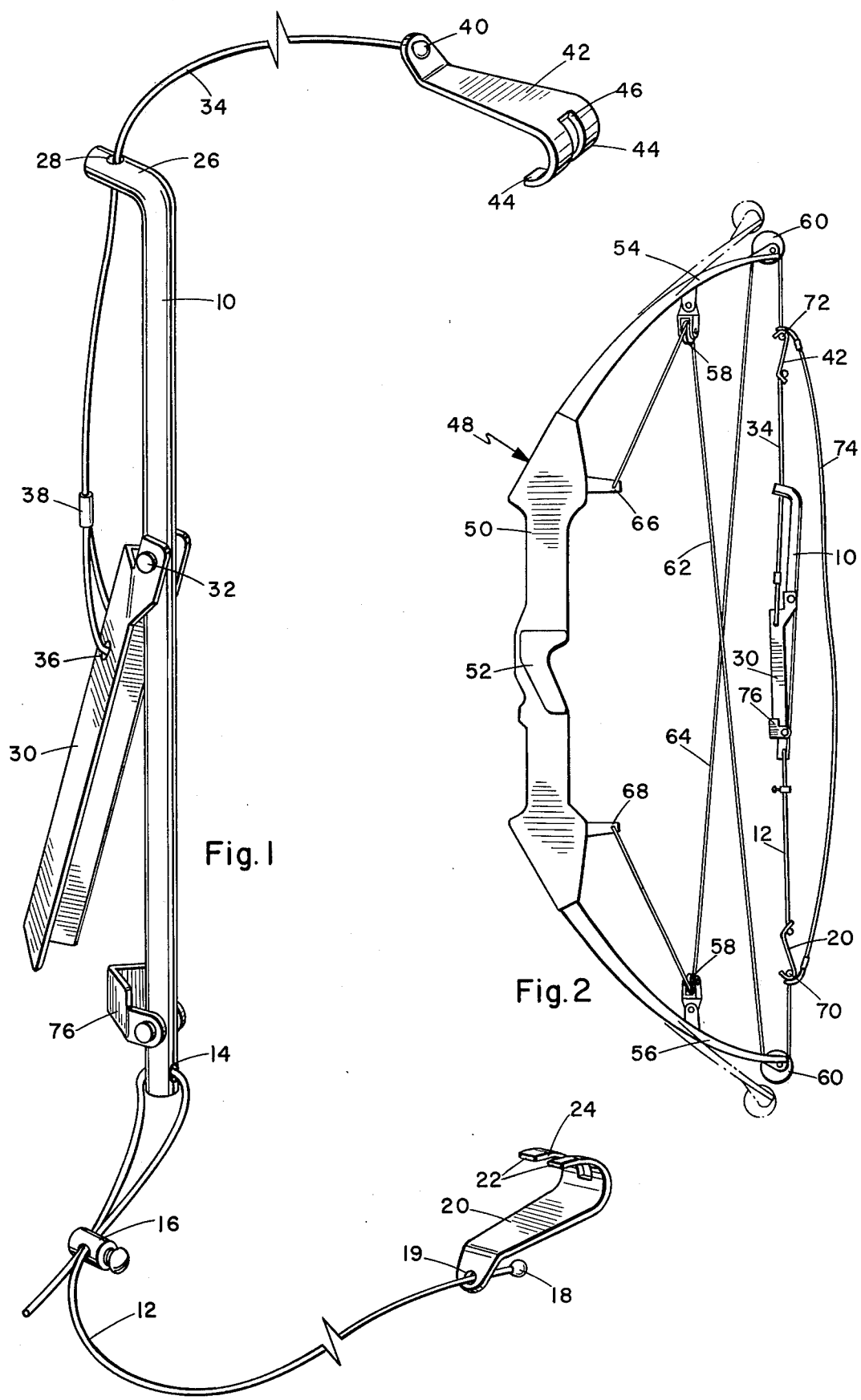

TOGGLE CLAMP FOR STRINGING COMPOUND BOW

BACKGROUND OF THE INVENTION

The present invention relates to bow apparatus and pertains particularly to an apparatus for stringing compound archery bows.

As archery bows become stronger and stronger, more suitable means must be provided for assisting in stringing the bow. The stringing of the bow involves tensioning or deflecting the arms of the bow to a position such that the bow string may be connected therebetween.

While suitable means have been provided for stringing or assisting in the stringing of simple bows, no such suitable equipment is available for field use in stringing of compound bows. Compound bows normally employ a cable and pulley arrangement for multiplying the advantage between the arms and the string of the bow. Such bows typically employ a cable having one end fixed to the body of the bow and strung between one or more pulleys secured to the spring arms of the bow with the opposite end connected to the ends of the bow string. Because of the strength of the arms of such bows the arms thereof cannot be suitable deflected sufficient to string the bow by the average individual.

Accordingly it is desirable that some suitable means be provided for deflecting the arms of such compound bows to enable the attachment of the bow string thereto. More particularly it is desirable that such apparatus be simple and easy to utilize and be portable for use in the field.

SUMMARY AND OBJECTS OF THE INVENTION

It is the primary object of the present invention to overcome the above problems of the prior art.

Another object of the present invention is to provide a simple and inexpensive apparatus for deflecting the arms of a compound bow for permitting stringing thereof.

A further object of the present invention is to provide a simple lever and cable arrangement of stringing apparatus for deflecting the arms of a compound bow for permitting the stringing thereof.

In accordance with the primary aspect of the present invention a bow string apparatus is provided which includes lever means having movable means for extending between the ends of the cables for deflecting the arms of the bow to permit ready attachment of the bow string thereto.

BRIEF DESCRIPTION OF THE DRAWING

The above and other objects and advantages of the present invention will become apparent from the following description when read in conjunction with the drawing wherein.

FIG. 1 is a perspective view of the preferred embodiment of the present invention.

FIG. 2 illustrates the device in use on a typical compound bow.

DETAILED DESCRIPTION OF A PREFERRED EMBODIMENT

The apparatus in accordance with the present invention, as best seen in FIG. 1, comprises an elongated central body member 10 illustrated as a cylindrical bar or rod, but may have any suitable configuration having attaching means on the lower end thereof comprising an elongated cable 12 extending through a bore 14 on the lower end of the body member 10. The cable extends through bore 14 at one end thereof and includes an adjustment clamp 16 for adjusting the length of the cable 12. The cable 12 includes an outer end having a swaged ball 18 or other member attached thereto for preventing the cable from pulling through a bore or hole 19 in a hook member 20. The hook member 20 has a pair of fingers or hook members 22, defining a generally bifurcated configuration with spaced apart fingers thereof having a slot 24 therebetween for receiving a cable.

The opposite end or upper end of the body member 10 as illustrated in FIG. 1 includes guide means in the form of a curved end 26 having a bore 28 extending therethrough substantially parallel to the axis of the body member 10. A toggle handle or lever 30 is pivotally connected by a suitable hinge pin 32 to the body member 10 between the ends thereof. The hinge pin 32 defines fulcrum means for the lever 30. A movable flexible cable 34 extends through the guide bore 28 and is connected by the one end thereof to the toggle handle or arm 30 by extending through a bore 36 therein and looping back and connected at the end thereof by a suitable swaged coupling 38 to the body of the cable. The upper end of the cable includes a swaged ball or end 40 which prevents the end thereof from pulling through a hole in upper hook member 42. The upper hook member 42 is identical to the lower hook member and includes a pair of fingers 44 separated for defining a slot 46 therebetween.

In operation, the handle 30 pivots about the hinge pin 32 in an upper direction for extending the upper cable 34 outward for extending the apparatus to its fully extended position. The handle or lever 30 pivots downward about the hinge pin 32 or pulling the upper cable 34 and the hook member 42 downward to the retracted position. In the retracted position the apparatus pulls the ends of cable of a typical compound bow for bending the arms thereof into a position such that a string may be strung between the ends of the cable.

Turning now to FIG. 2 of the drawings, there is illustrated a typical compound bow generally designated by the numeral 48. The compound bow includes a central body member 50 having a handle 52. A pair of flexible spring like arms 54 and 56 are connected to and extend outward from the central body member 50. Each arm includes one or more pulleys 58 and 60 through which a pair of cables 62 and 64 are strung. The cables are each connected at their inner ends 66 and 68 respectively to the central body member 50 and extend through the respective cable. The outer ends of each of the cables suitable end members 70 and 72 for attachment of the string for the bow. These cable ends may be of any suitable configuration such as hook or T-shaped and are connected such as by swaging to the end of the cable.

In the unstrung position the bow 48 is as illustrated in phantom in FIG. 2 with the arms 52 and 56 thereof extending in the outward position as shown. In this position the distance between the cable ends 70 and 72 are too great to receive the ends of a string 74. In order to string the cable the arms 54 and 56 must be brought inward as illustrated in solid lines in FIG. 2.

Thus, in operation, in order to string a bow the apparatus as in FIG. 1 is extended to its outer most position with toggle handle 30 pivoted in the upward position for an extension of the hooks 20 and 42 to their outermost positions. In these outermost positions each hook is hooked about the cable ends 70 and 72 with the cables 62 and 64 extending in the slots 24 and 46 between the fingers 22 and 44, respectively. The handle 30 is pivoting downward for pulling the hook members 42 and 20 together as illustrated in FIG. 2 for pulling the cable ends 70 and 72 inward to the innermost position. In this position a string 74 may then be attached between the ends of the cables 62 and 64. The slots 24 and 46 between the fingers 22 and 44 permit the string to be attached for engaging the ends 70 and 72 and extend between the fingers. Thus the stringing apparatus, after the string 74 has been attached between the two ends, may then be carefully released by pivoting the arm 30 or handle 30 upward permitting the hook 42 to extend upward until the ends of the cable are held by the string 74 pulled to the taught position. A handle latch or lock member 76 may be provided for holding the handle 30 in its latched or innermost position if desired. In an alternate construction the pivot pin and the holes 28 and 36 for the cable 34 may be in a misaligned or overcenter position such that the lever is pulled to the overcenter position. With such an overcenter arrangement the latch member 76 would be unnecessary.

While the present invention has been described and illustrated by means of a specific embodiment it is to be understood that numerous changes and modifications may be made therein without departing from the spirit and scope of the invention as defined in the appended claims.

I claim:

1. An apparatus for stringing archery bows, said apparatus comprising,
    an elongated body member having cable guide means on one end,
    a lever pivotally connected to said body member intermediate the ends thereof by means defining a fulcrum,
    first connecting means on the other end of said elongated body member for releasably connecting said other end of said body member to one end of an archery bow,
    second connecting means including an elongated cable connected at one end to said lever at a point spaced from said fulcrum and extending through said guide means to the other end of said bow so that pivotal movement of said lever on said body member in one direction pulls the ends of said bow toward one another for stringing said bow.

2. The bow stringing apparatus of claim 1 wherein said first connecting means and said second connecting means each includes hook means.

3. The bow stringing apparatus of claim 1 wherein said first connecting means includes a flexible tension member connected at one end to said body member, and a hook member connected to the other end of said flexible member.

4. The bow stringing apparatus of claim 3 wherein said hook members are bifurcated for permitting a bow string to pass therebetween.

5. The bow stringing apparatus of claim 4 wherein said hook means are adapted to engage string connecting members on the ends of cables of a compound bow for pulling said ends toward one another for connecting string thereto.

6. The bow string apparatus of claim 3 including adjusting means for adjusting one of said flexible tension members.

7. The apparatus of claim 1, wherein:
    said body member is a cylindrical bar,
    said guide means comprises said one end of said bar bent outward from the remainder of said bar, and a guide bore extending through said bar substantially parallel to the remainder of said bar, and
    said lever has a length that is less than the length of said body between said fulcrum and said other end of said body member.

8. The bow stringing apparatus of claim 3, including locking means pivotally connected to said body member for engaging and locking said lever to said body in said one direction.

* * * * *